Figure 1:
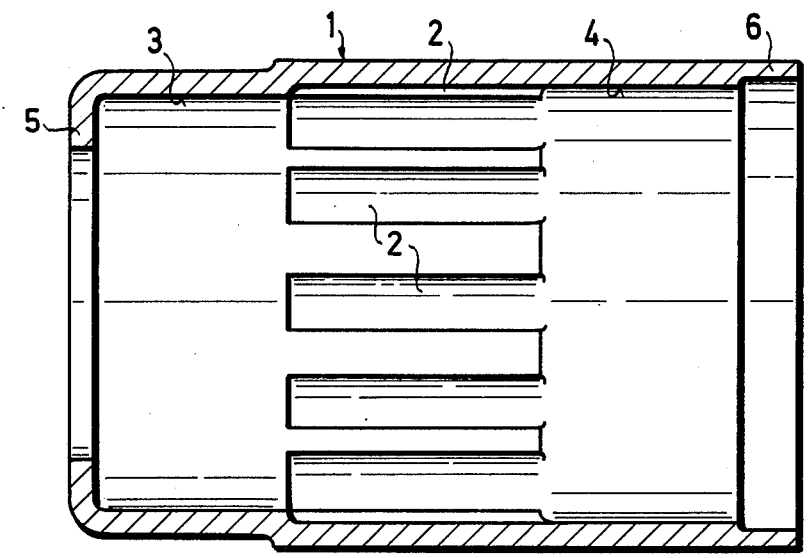

United States Patent [19]

Linz et al.

[11] 4,022,042

[45] May 10, 1977

[54] METHOD OF PRODUCING A THIN SHELL FOR OVERRUNNING ROLLER CLUTCHES

[75] Inventors: Leo Linz; Georg Schaeffler, both of Herzogenaurach, Germany

[73] Assignee: Industriewerk Schaeffler OHG, Herzogenaurach, Germany

[22] Filed: July 15, 1975

[21] Appl. No.: 596,070

[30] Foreign Application Priority Data

Aug. 3, 1974 Germany ......................... 2437488
Nov. 15, 1974 Germany ......................... 2454228

[52] U.S. Cl. ..................................... 72/62; 72/348;
29/148.4 R; 29/149.5 R; 29/DIG. 11
[51] Int. Cl.² .................. B21D 31/04; B21D 41/02
[58] Field of Search ..................... 72/62, 348, 370;
29/148.4 C, 149.5 C, DIG. 11, 148.4 R, 148.5 R; 113/117; 192/45

[56] References Cited

UNITED STATES PATENTS

| 30,647 | 11/1860 | Sharps | 72/62 |
| 688,927 | 12/1901 | BUnnell | 29/148.4 C |
| 2,743,691 | 5/1956 | Cuq | 72/62 |
| 2,929,345 | 3/1960 | Zatyko, Sr. | 72/348 |
| 3,194,368 | 7/1965 | Benson et al. | 192/45 |
| 3,405,546 | 10/1968 | Hoffman et al. | 72/348 |

FOREIGN PATENTS OR APPLICATIONS

| 483,242 | 7/1953 | Italy | 72/62 |
| 1,313,271 | 4/1973 | United Kingdom | 192/45 |

Primary Examiner—C.W. Lanham
Assistant Examiner—Daniel C. Crane
Attorney, Agent, or Firm—Hammond & LIttell

[57] ABSTRACT

A novel method for the production of a thin shell outer member for an overrunning roller clutch with cylindrical rollers at each end and a central portion profiled to form camming surfaces for the grip rollers and the two ends having smooth cylindrical recesses for the cylindrical rollers.

3 Claims, 3 Drawing Figures

METHOD OF PRODUCING A THIN SHELL FOR OVERRUNNING ROLLER CLUTCHES

STATE OF THE ART

U.S. Pat. No. 3,194,368 describes a thin-walled shell member in an overrunning roller clutch wherein the diameter of one outer race is smaller than the diameter of the intermediate camming surfaces and the diameter of the other outer race is greater than the diameter of the intermediate camming surfaces. This step design was believed necessary for manufacturing reasons, but a disadvantage of this construction is that rollers with different diameters must be used for the two roller bearings at either end. Since the differences in the diameters of the rollers are very small, it is not possible to use rollers of two standard sizes and this requires considerable additional expenditures in the manufacture, sorting and stock-keeping of the rollers. In the assembly care must be taken that the two sizes of the rollers are not mixed up.

To avoid this disadvantage, a method has been suggested in British patent No. 1,313,271 for the production of such thin-walled sleeves wherein the races for the rollers arranged at both sides of the profiled clutch region have the same diameter. This was achieved by producing at first a shell drawn from sheet metal which had on one side next to the central clutch region a cylindrical race whose diameter was equal to or smaller than the diameter of the inner envelope circle of the camming surfaces and which had at its other end, with the same wall thickness an inside diameter which was equal to or greater than the diameter of the outer envelope circle of the camming surfaces. In another operation, the sleeve was pulled through a matrix wherein the last mentioned race region was reduced to the diameter which the first race region had.

Shells produced by this method have the disadvantage, however, that the camming surfaces of the overrunning clutch region have a larger diameter than the race regions for the rollers adjacent thereto. This manifests itself in that the cage receiving the camming rollers can only have an outside diameter which corresponds to the diameter of the races for the rollers. It is thus not possible to make the shell engaging the camming surfaces with a corresponding profile on its outer wall to prevent its rotation. This security against rotation could perhaps be achieved by additional measures which require, however, additional manufacturing stages, and thus increase the costs of the entire overrunning clutch.

OBJECTS OF THE INVENTION

It is an object of the invention to provide a novel method of producing a thin-walled shell for an overrunning roller clutch with two equal race diameters in the bearing regions in an economical fashion.

This and other objects and advantages of the invention will become obvious from the following detailed description.

THE INVENTION

The novel process of the invention for the production of a thin-walled outer shell for an overrunning roller clutch comprises first drawing a thin-walled shell whose bore is profiled in the central region to form the camming surfaces for the cam rollers and overrunning clutch and which is designed in an adjacent region as a smooth cylindrical race for the rollers with a diameter which is equal to or greater than the diameter of the outer envelope circle of the camming surfaces, while the region on the other side of the camming surfaces has with the same wall thickness an inside diameter which is equal to or smaller than the diameter of the inner envelope circle of the camming surfaces, and subsequently the shell is inserted into the bore of a matrix and widened by the application of internal pressure in the last mentioned race area until it bears against the matrix bore.

The internal pressure for widening the sleeve can be produced, for example, by an elastically deformable die of rubber, plastic etc. which is inserted in known manner into the sleeve and put under pressure by a plunger. The same results can be achieved, however, by producing the internal pressure for widening the sleeve by a rotating rolling tool.

With the above described method it is readily possible to produce such a thin-walled shell without major manufacturing costs, where not only the two races for the rollers have the same diameter, but where the camming surfaces of the central overrunning clutch surmount the two roller races to such an extent on the inside that a cage receiving the cam rollers can engage the camming surfaces with a corresponding profile on its outer wall and thus be secured against rotation.

Figure 2:
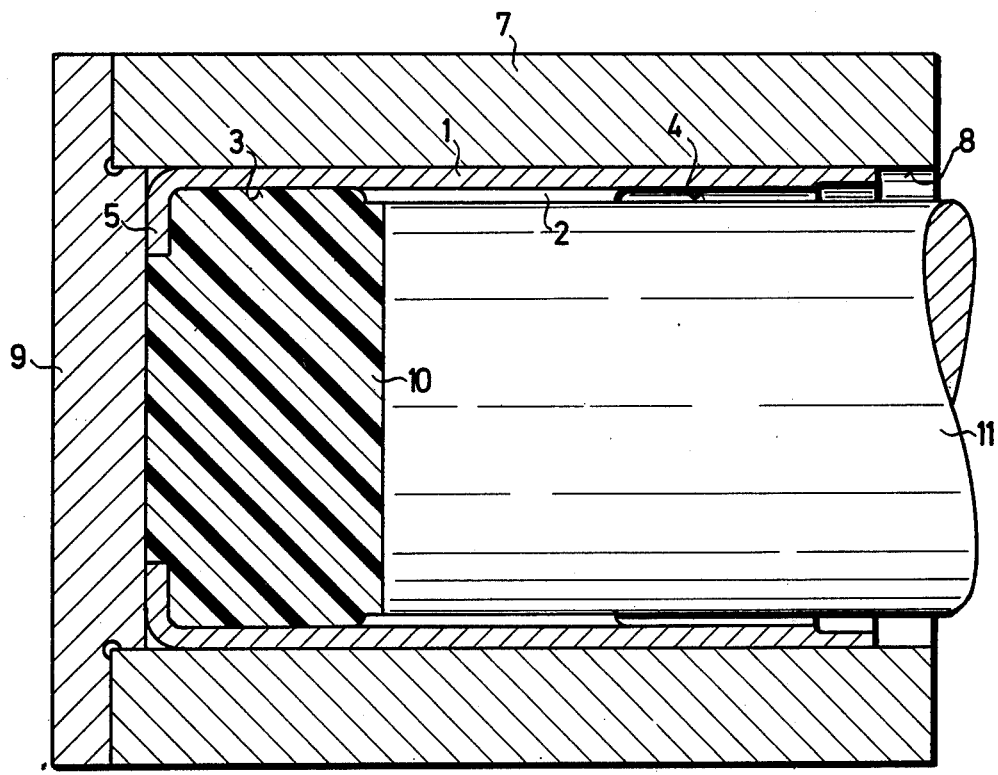
Figure 3:
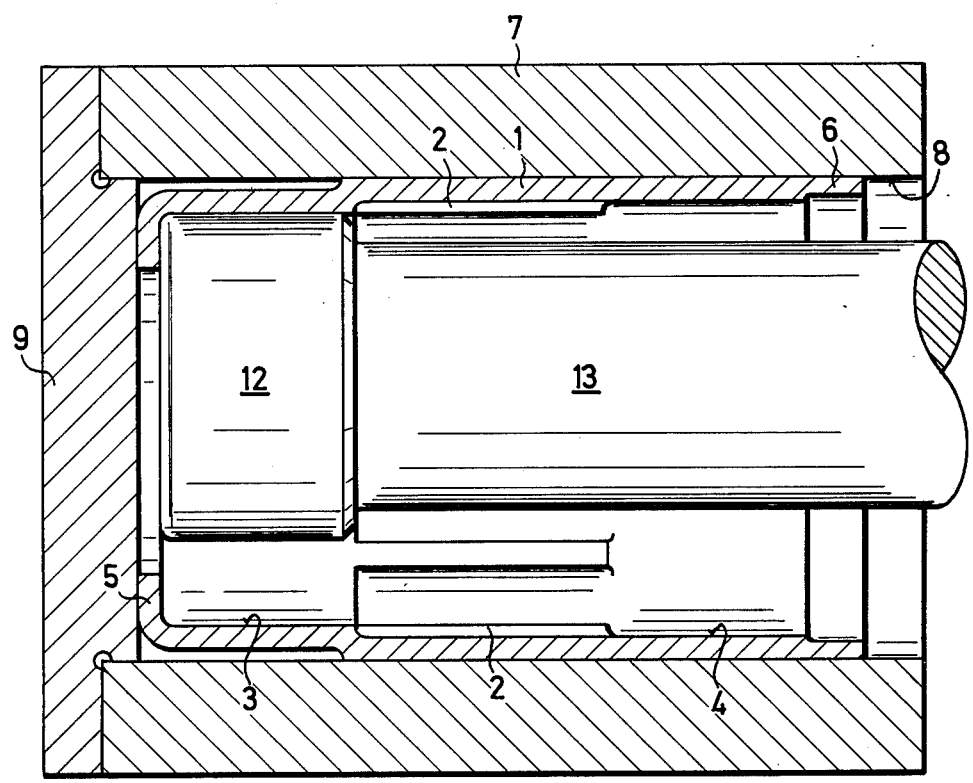

Referring now to the drawings:

FIG. 1 is a longitudinal cross-section through the drawn, thin-walled metal shell, FIG. 2 is a longitudinal cross-section through the shell and an elastically deformable die, and FIG. 3 is a longitudinal cross-section through the shell with a rolling tool.

The shell 1 has in its central region camming surfaces 2 and in the adjacent regions cylindrical roller races 3 and 4. In the state represented in FIG. 1 after the completion of the drawing process, the diameter of race 3 is smaller than that of race 4. The shell 1 has, however, the same wall thickness in both regions, so that the outside diameter of the sleeve is smaller in the area of race 3 than in the other regions. At the end of race 3, the shell is provided with an inwardly extending flange 5, while it has at the other end an area 6 of reduced wall thickness which is likewise provided with a radial inwardly directed flange after the cages with the rollers or cam rollers have been inserted.

FIG. 1 shows that, after the drawing process is completed, the diameter in the area of race 3 corresponds to the diameter of the inner envelope circle of the camming surfaces 2, while the diameter of race 4 corresponds to the diameter of the outer envelope circle of the camming surfaces 2. Technically, it would be possible to make the diameter even smaller in the area of race 3 and greater in the area of race 4.

According to FIG. 2, shell 1 is embedded in a matrix 7, with the shell bearing tightly on its bore 8 in the area corresponding to the overrunning clutch region and the area of race 4. Since it has at first a smaller outside diameter in the area of race 3, it will have at first a space in this area relative to the bore 8 of matrix 7. Matrix 7 is closed at one end by a bottom plate 9 against which sleeve 1 bears with its flange 5. An elastically deformable die 10 of rubber, plastic, etc. which can be admitted by an axially movable plunger 11 is inserted into shell 1 in the area of race 3. If an axial pressure is exerted by plunger 11 on the elastically deformable die 10, the latter expands radially and forces the sleeve in the area of race 3 to the outside until it likewise bears tightly against the bore of matrix 7. After this step, it is only necessary to pull out die 10 and plunger 11, and the finished shell 1 can be forced out of matrix 7.

In the embodiment of the process illustrated in FIG. 3, the elastically deformable die has been replaced by a rolling tool 12 which is carried by shaft 13 and which is introduced into the shell. Rolling tool 12 is adapted in its width to the width of race 3 and acts in this area on shell 1. By rotating this rolling tool 12, a radial pressure can be exerted in the area 3 of shell 1, so that the shell is forced out in this area until it likewise bears tightly against the bore of matrix 7.

It is within the framework of the invention to produce the reduction of the outside diameter in the area of race 3 not during the drawing process, but subsequently, for example, by chip removal such as turning or grinding.

Various modifications of the method of the invention may be made without departing from the spirit or scope thereof and it is to be understood that the invention is to be limited only as defined in the appended claims.

We claim:

1. A method for producing a thin-walled outer shell for an overrunning roller clutch provided with central profiled camming surfaces for cam rollers with an outer envelope circle and an inner envelope circle and smooth roller races at either end comprising drawing a thin-walled shell whose bore is profiled in the central region to form the camming surfaces for the cam rollers and overrunning clutch and which is designed in an adjacent region as a smooth cylindrical race for the rollers with a diameter which is equal to or greater than the diameter of the outer envelope circle of the camming surfaces, while the region on the other side of the camming surfaces has with the same wall thickness an inside diameter which is equal to or smaller than the diameter of the inner envelope circle of the camming surfaces, and subsequently inserting the shell into a bore of a matrix and widening by the application of internal pressure in the last mentioned race area until it bears against the matrix bore.

2. The method of claim 1 wherein the internal pressure for widening the shell is produced by an elastically deformable die.

3. The method of claim 1 wherein the internal pressure for widening the shell is produced by a rotating tool die.

* * * * *